United States Patent
Nishida et al.

(10) Patent No.: US 9,828,538 B2
(45) Date of Patent: Nov. 28, 2017

(54) THERMALLY CONDUCTIVE FILLER AND THERMALLY CONDUCTIVE RESIN COMPOSITION CONTAINING SAME

(71) Applicant: Ube Materials Industries, Ltd., Ube-shi, Yamaguchi (JP)

(72) Inventors: Naoto Nishida, Ube (JP); Seiji Yamaguchi, Yamaguchi (JP); Akira Yoshida, Ube (JP); Satoshi Shimmatsu, Yamaguchi (JP)

(73) Assignee: UBE MATERIAL INDUSTRIES, LTD., Ube-shi (JP)

( * ) Notice: Subject to any disclaimer, the term of this patent is extended or adjusted under 35 U.S.C. 154(b) by 0 days.

(21) Appl. No.: 15/022,170

(22) PCT Filed: Sep. 10, 2014

(86) PCT No.: PCT/JP2014/073880
§ 371 (c)(1),
(2) Date: Mar. 15, 2016

(87) PCT Pub. No.: WO2015/041110
PCT Pub. Date: Mar. 26, 2015

(65) Prior Publication Data
US 2016/0222273 A1    Aug. 4, 2016

(30) Foreign Application Priority Data
Sep. 17, 2013 (JP) .................................. 2013-191546

(51) Int. Cl.
| | | |
|---|---|---|
| *C09K 5/14* | (2006.01) | |
| *C08L 101/00* | (2006.01) | |
| *C04B 35/053* | (2006.01) | |
| *C04B 35/64* | (2006.01) | |
| *C01F 5/08* | (2006.01) | |
| *C08K 3/22* | (2006.01) | |
| *C08K 3/36* | (2006.01) | |

(52) U.S. Cl.
CPC ............... *C09K 5/14* (2013.01); *C01F 5/08* (2013.01); *C04B 35/053* (2013.01); *C04B 35/64* (2013.01); *C08K 3/22* (2013.01); *C08K 3/36* (2013.01); *C08L 101/00* (2013.01); *C04B 2235/3208* (2013.01); *C04B 2235/3418* (2013.01); *C04B 2235/5436* (2013.01); *C04B 2235/9669* (2013.01); *C08K 2201/001* (2013.01); *C08K 2201/014* (2013.01)

(58) Field of Classification Search
CPC ...................................................... C09K 5/14
See application file for complete search history.

(56) References Cited

FOREIGN PATENT DOCUMENTS

| | | | | |
|---|---|---|---|---|
| JP | 1987-296303 A | 12/1987 | | |
| JP | 08-268713 A | 10/1996 | | |
| JP | 2000-243225 A | 9/2000 | | |
| JP | 2004-027177 A | * | 1/2004 | ............ C08L 101/00 |
| JP | 2004-27177 A | | 1/2004 | |
| JP | 2010-173913 A | * | 8/2010 | ............ C04B 35/043 |
| JP | 2014-136654 A | | 7/2014 | |
| WO | JP 2010-173913 A | * | 8/2010 | ............ C04B 35/043 |
| WO | 2014/119462 A1 | | 8/2014 | |

OTHER PUBLICATIONS

International Search Report dated Dec. 2, 2014, issued in counterpart International Application No. PCT/JP2014/073880 (2 pages).
Japanese Office Action dated Apr. 4, 2017, issued in counterpart Japanese Patent Application No. 62-296303A with English translation. (6 pages).

\* cited by examiner

*Primary Examiner* — Robert Harlan
(74) *Attorney, Agent, or Firm* — Westerman, Hattori, Daniels & Adrian

(57) ABSTRACT

A thermally conductive resin filler including a sintered body containing at least magnesium oxide, calcium oxide, and silicon oxide, the thermally conductive filler being characterized in that, when the molar number of calcium element contained in the total composition of the sintered body in terms of calcium oxide (CaO) is defined as MCa, and the molar number of silicon element contained in the total composition of the sintered body in terms of silicon oxide ($SiO_2$) is defined as MSi, the molar ratio of the calcium oxide (CaO) to the silicon oxide ($SiO_2$) represented by MCa/MSi is in the range of 0.1 or more and less than 2.0.

3 Claims, No Drawings

US 9,828,538 B2

THERMALLY CONDUCTIVE FILLER AND THERMALLY CONDUCTIVE RESIN COMPOSITION CONTAINING SAME

TECHNICAL FIELD

The present invention relates to a thermally conductive filler and a thermally conductive resin composition containing the same, and particularly relates to a thermally conductive filler mainly including magnesium oxide and a thermally conductive resin composition containing the same.

BACKGROUND ART

Magnesium oxide is an inorganic compound excellent in thermal conductivity, thermal resistance, and the like, and is used in various resins as a thermally conductive filler for enhancing thermal conductivity of a resin composition. When magnesium oxide is used as a thermally conductive filler, its moisture resistance (also referred to as slaking resistance) is a problem. Conventionally, the surface of magnesium oxide is coated with an oxide such as silicon oxide or a resin such as epoxy or silicone, thereby preventing water from contacting with the magnesium oxide.

For example, Patent Literature 1 describes that a magnesium oxide filler of an electron emission element is coated with silicon oxide ($SiO_2$), thereby enhancing the thermal conductivity of the electron emission element. Also, Patent Literature 2 describes that a coating layer of silicon or the like is formed on the surface of magnesium oxide powder, to form a resin composition excellent in moisture resistance and thermal conductivity.

CITATION LIST

Patent Literature

Patent Literature 1: JP 2000-243225 A (claim 1, paragraph 0015, etc.)
Patent Literature 2: JP 2004-27177A (claim 1, paragraph 0011, etc.)

SUMMARY OF INVENTION

Technical Problem

However, in a method of coating the surface of magnesium oxide with a coating layer, there has been a problem that production of a thermally conductive filler is complicated, thus productivity is low.

An object of the present invention is to provide a thermally conductive filler having high moisture resistance and good productivity, and a thermally conductive resin composition containing the same.

Solution to Problem

The present inventors have intensively studied for achieving the above object, and consequently found that the molar ratio of silicon oxide to calcium oxide contained in magnesium oxide is set within the predetermined range, whereby moisture resistance of the thermally conductive filler can be enhanced even without coating the surface, thereby completing the present invention.

More specifically, the present invention is a thermally conductive resin filler including a sintered body containing at least magnesium oxide, calcium oxide, and silicon oxide, the thermally conductive filler being characterized in that, when the molar number of calcium element contained in the total composition of the sintered body in terms of calcium oxide (CaO) is defined as MCa, and the molar number of silicon element contained in the total composition of the sintered body in terms of silicon oxide ($SiO_2$) is defined as MSi, the molar ratio of the calcium oxide (CaO) to the silicon oxide ($SiO_2$) represented by MCa/MSi is in the range of 0.1 or more and less than 2.0.

In this case, it is preferred that the magnesium oxide is in the range of 94.0 to 99.7% by mass, the calcium oxide is in the range of 0.1 to 1.5% by mass, and the silicon oxide is in the range of 0.1 to 3.0% by mass.

Furthermore, it is preferred that, after being held at a temperature of 85° C. and a humidity of 85% for 48 hours, the mass-increasing rate represented by following Formula (1) is 0.5% by mass or less.

Mass-increasing rate=(Mass-increased amount of thermally conductive filler after being held/ Mass of thermally conductive filler before being held)×100(%)    Formula (1)

Also, the present invention is a thermally conductive resin composition containing the thermally conductive filler as defined in any of the above, and a resin.

Advantageous Effects of Invention

According to the present invention, a thermally conductive filler having high moisture resistance and good productivity, and a thermally conductive resin composition containing the same can be provided.

DESCRIPTION OF EMBODIMENTS

<Thermally Conductive Filler>

The thermally conductive filler of the present invention (hereinafter, simply referred to as "thermally conductive filler") is preferably a sintered body containing at least magnesium oxide (MgO), calcium oxide (CaO) and silicon oxide ($SiO_2$).

Other than magnesium oxide (MgO), silicon oxide ($SiO_2$), and calcium oxide (CaO), the thermally conductive filler may contain a compound reacted with these compounds.

In the thermally conductive filler, the molar ratio of the calcium oxide (CaO) to the silicon oxide ($SiO_2$) (hereinafter, referred to as Ca/Si ratio) is in the range of 0.1 or more and less than 2.0. Here, the molar number of the silicon oxide ($SiO_2$) means a molar number of silicon element (MSi) contained in the total composition of the thermally conductive filler in terms of silicon oxide ($SiO_2$). Also, the molar number of the calcium oxide (CaO) means a molar number of calcium element (MCa) contained in the total composition of the thermally conductive filler in terms of calcium oxide (CaO). In addition, the Ca/Si ratio is a value represented by MCa/MSi.

When the Ca/Si ratio is below 0.1, the ratio of silicon oxide is relatively high, thus the strength of the thermally conductive filler tends to be low. On the other hand, when the Ca/Si ratio is 2.0 or more, the ratio of calcium oxide is relatively high, thus moisture resistance tends to be low. The Ca/Si ratio is preferably in the range of 0.4 to 1.5, and more preferably in the range of 0.8 to 1.2.

The content of magnesium oxide is preferably in the range of 94.0 to 99.7% by mass, based on 100% by mass of the total mass of the thermally conductive filler. When the content of magnesium oxide is below 94.0% by mass, thermal conductivity of the thermally conductive filler tends to be low. Also, when the content of magnesium oxide exceeds 99.7% by mass, the content of other components is relatively low, thus moisture resistance and the like tend to be low.

The thermally conductive filler may contain other elements and compounds, for example, may contain $B_2O_3$, $Al_2O_3$, $Fe_2O_3$, $Na_2SO_4$, and the like. Furthermore, $B_2O_3$ is also an ionic impurity, and possibly causes an error of an electronic circuit, thus, when the content in the thermally conductive filler is high, it is inconvenient for being used in the field of electronic equipment such as parts for semiconductor packaging. The content of $B_2O_3$ is preferably in the range of 0.2% by mass or less, more preferably in the range of 0.1% by mass or less, and particularly preferably in the range of 0.05% by mass or less, based on 100% by mass of the total mass of the thermally conductive filler.

Here, the values of the molar number, molar ratio, % by mass and the like of each oxide contained in the thermally conductive filler can be measured by ICP method using an inductively coupled plasma (ICP) emission spectrometer and a method such as a chelate titration method using a chelating agent such as EDTA. The values of the molar number, molar ratio, and % by mass in the present invention are defined as the values measured by the same method as the ICP method described in the Examples described below.

The shape of the thermally conductive filler is not particularly limited, and is preferably spherical or plate-like. The thermally conductive fillers having such shapes are likely to contact with each other to forma thermal conduction path, thus thermal conductivity tends to be high.

Although the particle size of the thermally conductive filler is not particularly limited, the particle size represented by median diameter (D50) is preferably in the range of 0.5 to 100 µm, more preferably in the range of 1 to 80 µm, and particularly preferably in the range of 5 to 60 µm. In a case where D50 is below 0.5 µm, when the thermally conductive filler is mixed with a resin to form into a thermally conductive resin composition, the viscosity increases and handling performance tends to be deteriorated. On the other hand, in a case where D50 exceeds 100 µm, the particle size is too large, thus the appearance of the thermally conductive resin composition is spoiled. The particle size of the thermally conductive filler may be adjusted by combining crushing and classification.

The thermally conductive filler is excellent in moisture resistance, and specifically, after being held at a temperature of 85° C. and a humidity of 85% for 48 hours, the mass-increasing rate represented by following Formula (1) tends to be low, like 0.5% by mass or less.

Mass-increasing rate=(Mass-increased amount of thermally conductive filler after being held/ Mass of thermally conductive filler before being held)×100(%)　　Formula (1)

<Method for Producing Thermally Conductive Filler>

The thermally conductive filler is preferably a mixture containing at least magnesium hydroxide, calcium oxide and silicon oxide as raw materials, and can be produced by a burning step of burning the mixture at high temperature. The method for producing the thermally conductive filler of the present invention will be described below.

(1) Raw Material Preparation

A mixture at least contains magnesium hydroxide (Mg(OH)$_2$), calcium oxide (CaO), and silicon oxide (SiO$_2$) as raw materials. The method for producing magnesium hydroxide includes a method for generating magnesium hydroxide by reacting seawater with lime, a method for purifying magnesium hydroxide from brucite that is a natural mineral, and the like. Also, calcium oxide and silicon oxide can be purified from limestone and the like, and silica minerals and the like, respectively. As a raw material mixture, three raw materials, that is, magnesium hydroxide purified in high purity, calcium oxide and silicon oxide can be mixed and used. In addition, as a raw material, by using calcium oxide and silicon oxide contained in magnesium hydroxide as impurities, the calcium oxide and silicon oxide purified as described above may not be added.

Here, as to the method for producing magnesium hydroxide in high purity with less amount of impurities such as calcium and silicon, for example, JP 59-190217 A can be referred. In addition, the magnesium hydroxide containing calcium oxide and silicon oxide as impurities should be adjusted such that finally contained component is in an arbitrary ratio, and it can be produced by omitting ion exchange treatment for removing impurities in the literature, or the like. The mixing method of raw materials may be either dry mixing or wet mixing, and can include methods of mechanically mixing using a publicly known mixer.

(2) Burning Step

Burning step is a step for burning the mixture obtained in the mixing step at high temperature. The burning can be performed using a publicly known device such as an electric furnace, a gas furnace, or a rotary kiln. The burning temperature can be appropriately set in the range of 1400 to 2800° C., and is in the range of preferably 1600 to 2600° C., and more preferably 2000 to 2400° C. When the burning temperature is below 1400° C., burning is insufficient, magnesium hydroxide is hard to crystallize, and the density is lowered, thus the strength tends to be lowered. Also, when the burning temperature exceeds 2800° C., it exceeds the melting point of magnesium oxide.

<Thermally Conductive Resin Composition>

The thermally conductive filler can be added to a resin to enhance thermal conductivity of a resin composition. Hereinafter, the thermally conductive resin composition of the present invention (hereinafter, simply referred to as "the thermally conductive resin composition") will be described.

The kind of the resin added to the thermally conductive resin composition can be appropriately set depending on the intended use and the like, and for example, may be a thermoplastic resin such as an olefin resin or an acrylic resin, and may be a thermosetting resin such as an epoxy resin or a phenolic resin. The added amount of each component is 1 to 90 parts by mass of a thermally conductive filler and 10 to 99 parts by mass of a resin, based on 100% by mass of the total mass of the thermally conductive resin composition. When the added amount of the thermally conductive filler is below 1 part by mass, thermal conductivity of the obtained resin composition tends to be low. In addition, when the added amount of the thermally conductive filler exceeds 90 parts by mass, the ratio of the thermally conductive filler increases, thus production cost increases, and it is likely to exert adverse effects on resin characteristics.

The thermally conductive resin composition can be produced by mixing a resin with the thermally conductive filler by a publicly known method. Also, the obtained thermally conductive resin composition can be formed by a publicly known method such as extrusion molding, and worked into a desired shape.

The thermally conductive resin composition is excellent in moisture resistance, and specifically, after being held at a temperature of 85° C. and a humidity of 85% for 48 hours, the mass-increasing rate represented by following Formula (2) tends to be low, like 0.1% by mass or less.

Mass-increasing rate=(Mass-increased amount of thermally conductive resin composition after being held/Mass of thermally conductive resin composition before being held)×100(%)  Formula (2)

The thermally conductive resin composition can be applied to various articles, and can be particularly preferably used to articles to which high thermal conductivity and moisture resistance are required. Examples of such articles include lamp socket and various electrical components, in the automobile field. Also, in the field of electronic equipment, examples of such articles include heat sink, die pad, printed wired board, parts for semiconductor packaging, parts for cooling fan, pickup parts, connector, switch, bearing, case housing, and the like.

EXAMPLES

Hereinafter, the present invention is specifically described with reference to Examples, but these Examples do not limit the object of the present invention, and the present invention is not limited to these Examples.

1. Evaluation Method
  (1) Substance Used for Kneading
  (a) Thermally conductive filler (MgO-A, -B, -C, -D)
  (b) Resin: ethylene ethyl acrylate (EEA) (manufactured by Ube-Maruzen Polyethylene Co, Ltd., ZE708)

2. Production of Thermally Conductive Filler

A mixture in which contents of magnesium hydroxide, calcium oxide and silicon oxide as raw materials were adjusted was burned at 1800° C. for 30 minutes by a rotary kiln to produce magnesium oxide powder. The obtained powder was sieved with a sieving of 200 mesh to remove coarse particles and make the particle size uniform, and defined as a thermally conductive filler. Four kinds of thermally conductive fillers were prepared, and MgO-A to Mg-C and MgO-D were defined as Examples 1 to 3 and Comparative Example 1, respectively. Each component is shown in Table 1. The contents of CaO and $SiO_2$ were calculated by analysis by ICP method in accordance with JIS R 2212-4, and the Ca/Si ratio was obtained by calculating the amounts of substance (molar number) from the contents of the obtained CaO and $SiO_2$ and dividing these values. Also, the median diameter (D50) of the thermally conductive filler obtained by using an HRA type microtrack particle size distribution measuring device manufactured by Nikkiso Co., Ltd. was measured. These results are also shown in Table 1.

TABLE 1

|  | Example 1 | Example 2 | Example 3 | Comparative Example 1 |
|---|---|---|---|---|
| Sample name | MgO-A | MgO-B | MgO-C | MgO-D |
| D50 (μm) | 50.2 | 46.2 | 53.1 | 31.4 |
| MgO (%) | 95.5 | 97.0 | 99.5 | 99.0 |
| CaO (%) | 1.05 | 0.99 | 0.25 | 0.60 |
| $SiO_2$ (%) | 2.82 | 1.06 | 0.18 | 0.21 |
| $B_2O_3$ (%) | 0.31 | 0.84 | 0.003 | 0.026 |
| Ca/Si ratio (molar ratio) | 0.4 | 1.0 | 1.5 | 3.1 |

3. Moisture Resistance Test of Thermally Conductive Filler

Moisture resistance was evaluated for the thermally conductive filler produced in "2. Production of thermally conductive filler". The evaluation method conformed to a reliability test as defined in EIAJ ED-4701/103 (high-temperature and high-humidity storage), and was performed by setting the evaluation time at 48 hours. First, 20 g of a sample of the thermally conductive filler was put on a porcelain dish, and the porcelain dish with the sample was put in a thermohygrostat bath at a temperature of 85° C. and a humidity of 85% (IW222 manufactured by Yamato Scientific Co., Ltd.) and held for 48 hours. Thereafter, the porcelain dish was taken out from the thermohygrostat bath, and the mass-increasing rate of the sample was measured. The mass-increasing rate was calculated as (Mass-increased amount after being held (g)/Initial mass of sample (20 g))×100(%). A mass-increasing rate of less than 0.5% was defined as "pass". The result is shown in Table 2.

TABLE 2

|  | Example 1-1 | Example 2-1 | Example 3-1 | Comparative Example 1-1 |
|---|---|---|---|---|
| Sample name | MgO-A | MgO-B | MgO-C | MgO-D |
| Ca/Si ratio (molar ratio) | 0.4 | 1.0 | 1.5 | 3.1 |
| Mass-increasing rate (% by mass) | 0.18 | 0.27 | 0.36 | 0.79 |
| Pass or fail (less than 0.5%) | Pass | Pass | Pass | Fail |

4. Kneading of Resin and Thermally Conductive Filler (Production of Thermally Conductive Resin Composition)

The thermally conductive filler was kneaded with the resin at a compounding ratio of 100 parts by mass based on the EEA resin. The compounding proportion is shown in Table 3. The kneading was conducted at 160° C. for 10 minutes, using a kneader (Labo Plastomill manufactured by Toyo Seiki Seisaku-sho, Ltd.). The kneaded material was heat-pressed at 165° C. to prepare a test piece of 120 mm×120 mm×2 mmT.

TABLE 3

|  | Example 1-2 | Example 2-2 | Example 3-2 | Comparative Example 1-2 |
|---|---|---|---|---|
| EEA | 100 | 100 | 100 | 100 |
| MgO-A | 100 |  |  |  |
| MgO-B |  | 100 |  |  |
| MgO-C |  |  | 100 |  |
| MgO-D |  |  |  | 100 |

5. Evaluation of Moisture Resistance of Thermally Conductive Resin Composition

The test piece prepared in "4. Kneading of resin and thermally conductive filler (production of thermally conductive resin composition)" was worked into a size of 50 mm×50 mm, and put in a thermohygrostat bath at a temperature of 85° C. and a humidity of 85% and held for 48 hours, in the same manner as in "3. Moisture resistance test of thermally conductive filler". Thereafter, the sample was taken out, and the mass-increasing rate was measured. The mass-increasing rate was calculated as (Mass-increased amount after being held (g)/Initial mass of sample (g))×100 (%). A mass-increasing rate of less than 0.1% was defined as "pass".

TABLE 4

|  | Example 1-3 | Example 2-3 | Example 3-3 | Comparative Example 1-3 |
|---|---|---|---|---|
| Sample name | MgO-A | MgO-B | MgO-C | MgO-D |
| Ca/Si ratio (molar ratio) | 0.4 | 1.0 | 1.5 | 3.1 |
| Mass-increasing rate (% by mass) | 0.07 | 0.05 | 0.07 | 0.11 |
| Pass or fail (less than 0.1%) | Pass | Pass | Pass | Fail |

It was found from the above results that, in Examples 1 to 3 with a Ca/Si ratio in the range of 0.1 to 2.0, both thermally conductive filler and thermally conductive resin composition have a markedly low mass-increasing rate under wet heat conditions and excellent moisture resistance, as compared to those in Comparative Example 1. On the other hand, it was found that, in Comparative Example 1 with a Ca/Si ratio more than 2.0, both thermally conductive filler and thermally conductive resin composition have a markedly high mass-increasing rate and extremely low moisture resistance, as compared to those in Examples 1 to 3.

The invention claimed is:

1. A thermally conductive resin composition comprising:
a thermally conductive resin filler comprising a sintered body containing at least magnesium oxide, calcium oxide, and silicon oxide, the thermally conductive filler being characterized in that, when the molar number of calcium element contained in the total composition of the sintered body in terms of calcium oxide (CaO) is defined as MCa, and the molar number of silicon element contained in the total composition of the sintered body in terms of silicon oxide ($SiO_2$) is defined as MSi, the molar ratio of the calcium oxide (CaO) to the silicon oxide ($SiO_2$) represented by MCa/MSi is in the range of 0.1 or more and less than 2.0; and
a resin,
wherein the thermally conductive resin filler further comprises $B_2O_3$ with a content in a range of 0.1% by mass or less based on 100% by mass of a total mass of the thermally conductive resin filler.

2. The thermally conductive resin composition according to claim 1, wherein the magnesium oxide is in the range of 94.0 to 99.7% by mass, the calcium oxide is in the range of 0.1 to 1.5% by mass, and the silicon oxide is in the range of 0.1 to 3.0% by mass.

3. The thermally conductive resin composition according to claim 1, wherein, after being held at a temperature of 85° C. and a humidity of 85% for 48 hours, the mass-increasing rate represented by following Formula (1) is 0.5% by mass or less;

mass-increasing rate=(Mass-increased amount of thermally conductive filler after being held/ Mass of thermally conductive filler before being held)×100(%)       Formula (1).

* * * * *